US010540627B2

(12) United States Patent
Eulenstein et al.

(10) Patent No.: US 10,540,627 B2
(45) Date of Patent: Jan. 21, 2020

(54) CONTENT RELEVANCE IN A SOCIAL NETWORKING SYSTEM USING POPULATION-REPRESENTATIVE HUMAN RATER POOL

(71) Applicant: Facebook, Inc., Menlo Park, CA (US)

(72) Inventors: Max Christian Eulenstein, San Francisco, CA (US); Lauren Elizabeth Scissors, San Francisco, CA (US); Alexander Peysakhovich, San Francisco, CA (US); Lars Seren Backstrom, San Francisco, CA (US); Lu Wang, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 687 days.

(21) Appl. No.: 14/960,179

(22) Filed: Dec. 4, 2015

(65) Prior Publication Data
US 2017/0161667 A1 Jun. 8, 2017

(51) Int. Cl.
G06Q 10/06 (2012.01)
G06Q 50/00 (2012.01)

(52) U.S. Cl.
CPC ....... G06Q 10/06398 (2013.01); G06Q 50/01 (2013.01)

(58) Field of Classification Search
None
See application file for complete search history.

(56) References Cited

U.S. PATENT DOCUMENTS

| 2005/0261953 A1* | 11/2005 | Malek | G06Q 30/02 705/7.32 |
| 2010/0169262 A1 | 7/2010 | Kenedy et al. | |
| 2010/0205541 A1* | 8/2010 | Rapaport | G06Q 10/10 715/753 |
| 2011/0258137 A1 | 10/2011 | Pasta | |
| 2012/0166532 A1* | 6/2012 | Juan | G06O 30/0224 709/204 |

(Continued)

OTHER PUBLICATIONS

Kevin R. Canini et al., Finding Credible Information Sources in Social Networks Based on Content and Social Structure, 2011 IEEE International Conference on Privacy, Security, Risk, and Trust, and IEEE International Conference on Social Computing, pp. 1-8.*

Primary Examiner — Christine M Behncke
Assistant Examiner — Matthew H Divelbiss
(74) Attorney, Agent, or Firm — Fenwick & West LLP

(57) ABSTRACT

A social networking system builds a quality controlled and desired population-representative pool of human raters to provide ratings on content items to improve a feed ranking model used for providing its users with more relevant content. The system identifies a pool of candidate human raters for providing ratings on a feed of content items. For each candidate human rater of the pool of candidate human raters, the system presents a feed of content items based on a feed ranking model, obtains ratings on the feed of content items, and determines a score representing the consistency of the obtained ratings, the representativeness of the pool of human raters, or the relevance of the content provided by the ranking model. The system uses the computed scores to modify the ranking model used to present content to its users for improving the relevance of the presented content.

20 Claims, 9 Drawing Sheets

(56) References Cited

U.S. PATENT DOCUMENTS

| | | | | |
|---|---|---|---|---|
| 2013/0031489 A1* | 1/2013 | Gubin | ................... | G06Q 10/10 715/753 |
| 2013/0262216 A1* | 10/2013 | Zhang | ................... | G06Q 30/02 705/14.36 |
| 2017/0201779 A1* | 7/2017 | Publicover | ......... | G06Q 30/0269 |

* cited by examiner

CONTENT RELEVANCE IN A SOCIAL NETWORKING SYSTEM USING POPULATION-REPRESENTATIVE HUMAN RATER POOL

BACKGROUND

This disclosure relates generally to improving relevance of content presented to a user, such as a social networking system user, and more particularly to improving content relevance based on content ratings by a pool of human raters.

Certain online systems, such as social networking systems, allow users to connect to and to communicate with other users of the system. For a social networking system, for example, users create profiles on the social networking system that are tied to their identities and include information about the users, such as interests and demographic information. The social networking system selects and presents content to a user to encourage the user to interact with the social networking system and with other users of the social networking system. For example, the social networking system generates a feed of content items for presentation to a user that includes content items describing actions performed by other users of the social networking system or content provided to the social networking system by other users of the social networking system.

When selecting content for presentation to a user, social networking systems can determine measures of relevance between various content items and the user. The measure of relevance between a user and a content item is typically based at least in part on the user's likelihood of interacting with the content item when the content item is presented. The measure of relevance can often be determined using machine intelligence by, for example, applying an automated ranking system and machine learning model to determine the most relevant content for a user. However, in some cases, there can be factors that a human user might consider in a relevance determination that are not considered in a machine-based system.

SUMMARY

An online system, such as a social networking system, builds a quality controlled and representative test population of human raters to provide content ratings on content items in their news feeds to improve a feed ranking model for providing its users with more relevant content in their news feeds. For example, the human raters are quality controlled by testing the raters against themselves to ensure consistency. The raters are modified to be representative of a user population of interest to the social networking system (e.g., general population of a country or a user population of the social networking system within the country). The raters allow the social networking system to test variations of the feed ranking model and to run simulations with those variations to improve a feed ranking model in determining the relevance of content presented to its user population of interest.

The social networking system identifies a pool of candidate human raters for providing ratings on a feed of content items. For each candidate human rater of the pool of candidate human raters, the social networking system presents a feed of content items based on a feed ranking model, obtains ratings on the feed of content items, and determines a score representing the consistency of the obtained ratings, the representativeness of the pool of human raters, or the relevance of the content provided by the ranking model.

The social networking system determines a consistency score for each candidate human rater that represents a degree of consistency between the various ratings provided by the candidate human rater. The consistency score includes two or more components associated with consistency factors such as person consistency, number-text consistency, temporal consistency, and "bake off" consistency. For example, the consistency score is determined by computing various component scores associated with the consistency factors and the consistency score is computed by aggregating the various component scores. The consistency scores are then used to select a pool of human raters from the identified pool of candidate human raters such that the ratings of the selected pool of human raters can be used for modifying the feed ranking model to improve the relevance of the presented content.

In one embodiment, the social networking system determines a representativeness score for the pool of human raters (e.g., the pool selected after performing quality checks) that represents a degree of similarity between the pool of human raters and the user population of interest (e.g., a score indicating how representative the human rater pool is of the user population of interest, such as all people in the U.S., all social networking system users in North America, etc.). The representativeness score includes two or more components associated with representativeness factors such as age, gender, amount of time spent on the social networking system, amount of likes, and a percentage of content associated with friends as opposed to pages. For example, the representativeness score is determined by computing various component scores associated with the representativeness factors and by aggregating the various component scores. The representativeness score of the identified pool is then used to revise the pool of human raters such that the revised pool has a sufficient degree of similarity to the user population of interest.

In another embodiment, the social networking system determines a relevance score for the feed ranking model that represents a degree of relevance of the content presented via the feed ranking model to the pool of human raters (e.g., pool selected after performing quality checks and modified using representativeness score). The relevance score includes two or more components associated with relevance factors such as person relevance, content relevance, type of impact relevance, amount of impact relevance, a type of content relevance, entertainment value relevance, informative value relevance, and an overall relevance. For example, the relevance score is determined by computing various component scores associated with the relevance factors and by aggregating the various component scores.

In a further embodiment, the social networking system tests variations to the feed ranking model and computes a relevance score associated with each of the tested variations by analyzing ratings of the pool of human raters corresponding to content items of each of the tested variations. The social networking system selects one of the feed ranking model variations that results in a high degree of relevance to the pool of human raters and in turn uses the selected variation to provide content items for its user population of interest, thereby increasing the content relevance for its user population of interest.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

System Architecture

Figure 1:
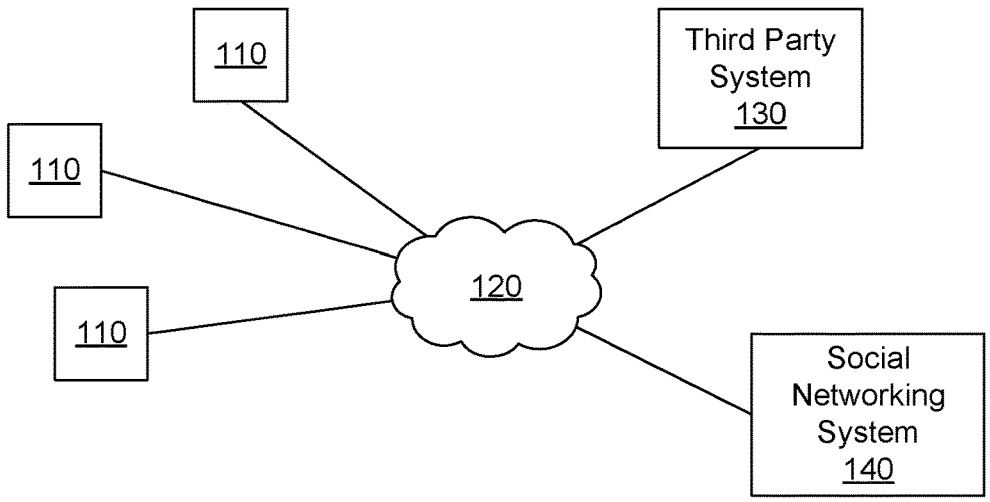
FIG. 1 is a block diagram of a system environment in which a social networking system operates, in accordance with an embodiment.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems presenting content to users that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
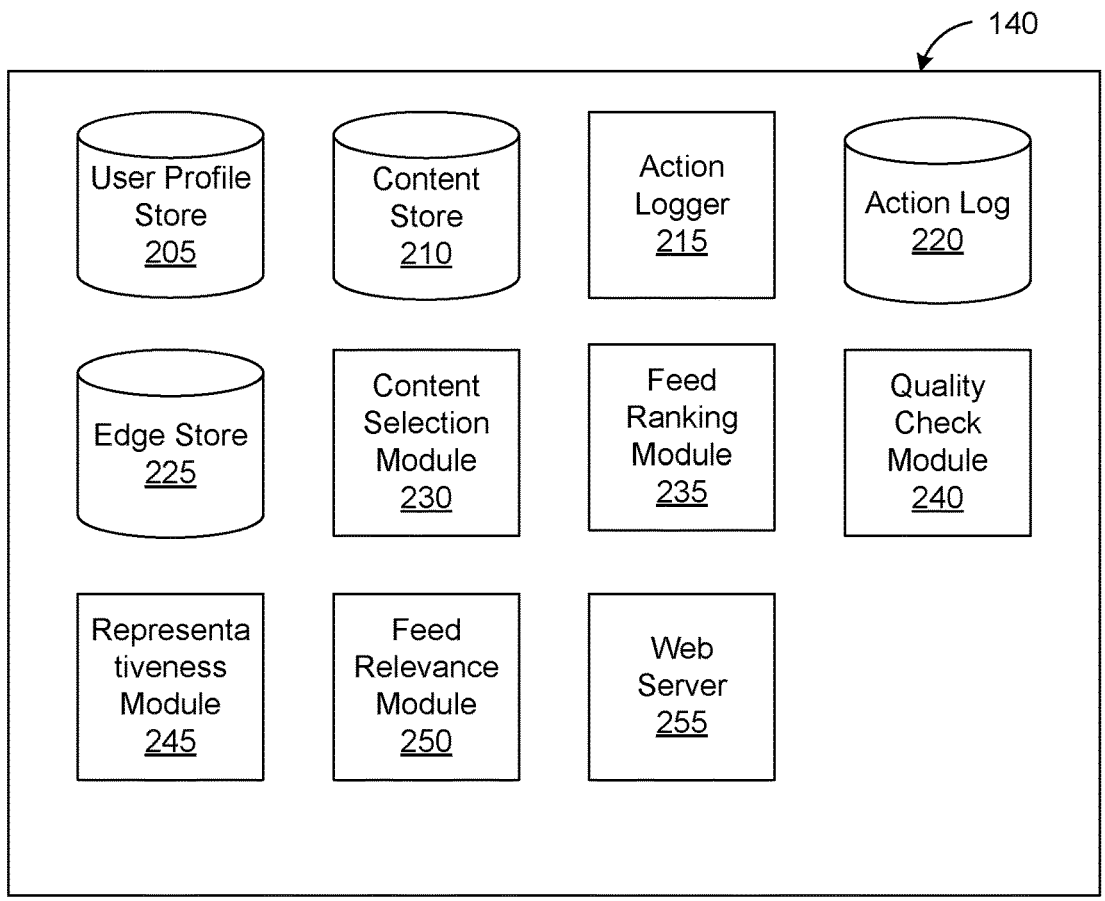
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a content selection module 230, a feed ranking module 235, a quality check module 240, a representativeness module 245, a feed relevance module 250, and a web server 255. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged or stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations (e.g., brand page). This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, social networking system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the social networking system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 to approximate a user's interest in an object or in another user in the social networking system 140 based on the actions performed by the user. A user's affinity may be computed by the social networking system 140 to approximate the user's interest in an object, in a topic, or in another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the user. A content item eligible for presentation to the user is a content item associated with at least a threshold number of targeting criteria satisfied by characteristics of the user or is a content item that is not associated with targeting criteria. Example targeting criteria include, whether the content item describes a user of the social networking system 140 that is connected to the user, whether the user previously accessed information describing an entity represented in the social networking system 140 that is described in the content item, whether the user interacted with another content item that is related to the current content item, and the like. One example of a content item is a newsfeed story that can include different fields or sets of information, such as a name of a user's friend or connection who posted the story or an object within the social networking system 140 with which the friend interacted (e.g., "John Smith invited Bob Roberts to John's 21st Birthday Party" or "John Smith liked Big Coffee website"). The story can include one or more graphics, can include links to content on or off of the social networking system 140, can include icons or fields with which the user can interact (e.g., a Like button, a Share button, a Comments field, etc.), can include sponsored content or an advertisement, and so forth.

The content selection module 230 invokes a feed ranking model to rank the content items being presented to the user. The content selection module 230 may present a subset of the content items based on the ranking, for example, the top 10 stories, depending on the display area available on a user interface for presenting the content items. The content selection module 230 presents the content items in the order determined by the ranking, for example, content items ranked higher may be presented more prominently compared to content items ranked lower. In an embodiment, the content items ranked higher are presented above the content items ranked lower. In other embodiments, content items ranked higher may be presented more prominently by displaying them using an appropriate text color, font, text size, back ground color, etc.

The feed ranking module 235 uses machine learning techniques to generate the feed ranking model used for ranking the content items. For example, the feed ranking module 235 may generate a ranking model that determines a ranking score associated with a given content item. The feed ranking model can determine a set of content items that are eligible for presentation to a user (e.g., that meet certain criteria, such as being a story by a friend or connection of the user), and can order the set of content items based on their ranking scores. The feed ranking model ranks new content items for a user based on information describing the user's past interactions with other content items (e.g., stories by connections with which the user frequently interacts on the social networking system 140 may be ranked higher than stories by connections with which the user rarely interacts). The information used in the ranking process includes data about interactions such as a time spent by the user on each content item, whether the user performed one or more actions such as click, like, comments, share, and the like.

The feed ranking module 235 uses the interaction data of the user from previous interactions to train a machine learning model to generate a ranking of future content items for presenting to the user. The machine learning model may use supervised learning, where the model is presented with a data set of example inputs and their desired outputs such that machine learning model can develop a general rule that can map any input to an output. For example, the machine learning model receives as an input the past interaction data for the user to develop a general rule for outputting a likelihood of the user interacting (e.g., like, comment, share etc) with a new content item, which can then be used in ranking the content item for presentation to the user. Examples of other feed ranking models that the feed ranking module 235 could use to rank content items in a newsfeed are described in more detail in U.S. patent application Ser. No. 13/194,770 filed Jul. 29, 2011 (issued as U.S. Pat. No. 8,768,863) and U.S. patent application Ser. No. 13/194,773 filed Jul. 29, 2011, each of which is incorporated by reference in its entirety.

The machine learning model develops the general rule by using factors related to interaction rates of a user associated with different attributes of content items such as an author of the content item and a type of content of the content item (e.g., text, photo, video, etc). The interaction rates include time spent on a content item, a click through rate (CTR) representing a percentage of content items clicked by the user, like through rate (LTR) representing a percentage of content items liked by the user, share through rate (STR) representing a percentage of content items shared by the user with other users, and comment through rate (CoTR) representing a percentage of content items commented on by the user. Each attribute of the content item may have a separate set of interaction rates for every user. For example, when a new content item to be ranked is authored by person A and is a photo, a set of interaction rates of the user for content items authored by person A and another set of interaction rates of the user for a photo content type are used by the machine learning model to determine a set of likelihoods that the user would perform interactions with the new content item. The determined set of likelihoods is then used in computing a ranking score, which is used for ranking new content items for presenting to the user.

The ranking score may include various components that correspond to the various interaction rates of the content item attributes. Each component has a weightage factor that may be different between various components. A ranking model may be varied by varying the weightage factors of the individual components. An example variation of a ranking model and presenting of a feed of content items is illustrated below in conjunction with FIG. 3.

The quality check module 240 analyzes ratings provided by candidate human raters to perform quality checks for selecting human raters that meet a threshold degree of consistency within the provided ratings. For example, the quality check module 240 computes a consistency score for each human rater that represents a degree of consistency for each human rater across the various ratings provided by the human rater as described below in conjunction with FIG. 7. The social networking system 140 selects a pool of human raters from the potential candidates based on the determined consistency scores as described further below in conjunction with FIG. 8. As described herein, human raters are people who review or interact with content on the social networking system 140 and provide ratings on the content according to a set of guidelines as described below in conjunction with FIG. 5. The human raters are typically users of the social networking system 140 but in some cases need not be users of the social networking system 140. The content being rated can be presented to the human raters in the form of a news feed, for example.

The representativeness module 245 analyzes the demographics of and the ratings provided by human raters to determine a level of similarity between the human raters and the user population of interest the social networking system 140 for selecting a pool of human raters that is representative of a user population of interest. For example, the representativeness module 245 determines the level of similarity by computing a representative score for the pool of human raters based on a set of representativeness factors as described further below in conjunction with FIG. 7. The social networking system 140 selects and revises a pool of human raters based on the determined representativeness score as described further below in conjunction with FIG. 9. The user population of interest to the social networking system 140 is a general population of a country in which the social networking system 140 operates, a user population of the social networking system 140 within the country, or another population of users of which the social networking system would like the raters to be representative in their makeup as a group.

The feed relevance module 250 analyzes ratings provided by human raters to determine degrees of relevance of content provided to users using different feed ranking models for selecting a feed ranking model that provides content with sufficient degree of relevance to the user population of interest. For example, the feed relevance module 250 determines the degree of relevance by computing relevance scores for each human rater based on the various ratings provided by the human rater for content items delivered using the different feed ranking models as described further below in conjunction with FIG. 7. The social networking system 140 selects an appropriate or a highest quality feed ranking model based on the determined relevance scores as described further below in conjunction with FIG. 10.

The web server 255 links the social networking system 140 via the network 120 to the one or more client devices 110, as well as to the one or more third party systems 130. The web server 255 serves web pages, as well as other content, such as JAVA®, FLASH®, XML and so forth. The web server 255 may receive and route messages between the social networking system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Example Presentation of a Feed of Content Items

Figure 3:
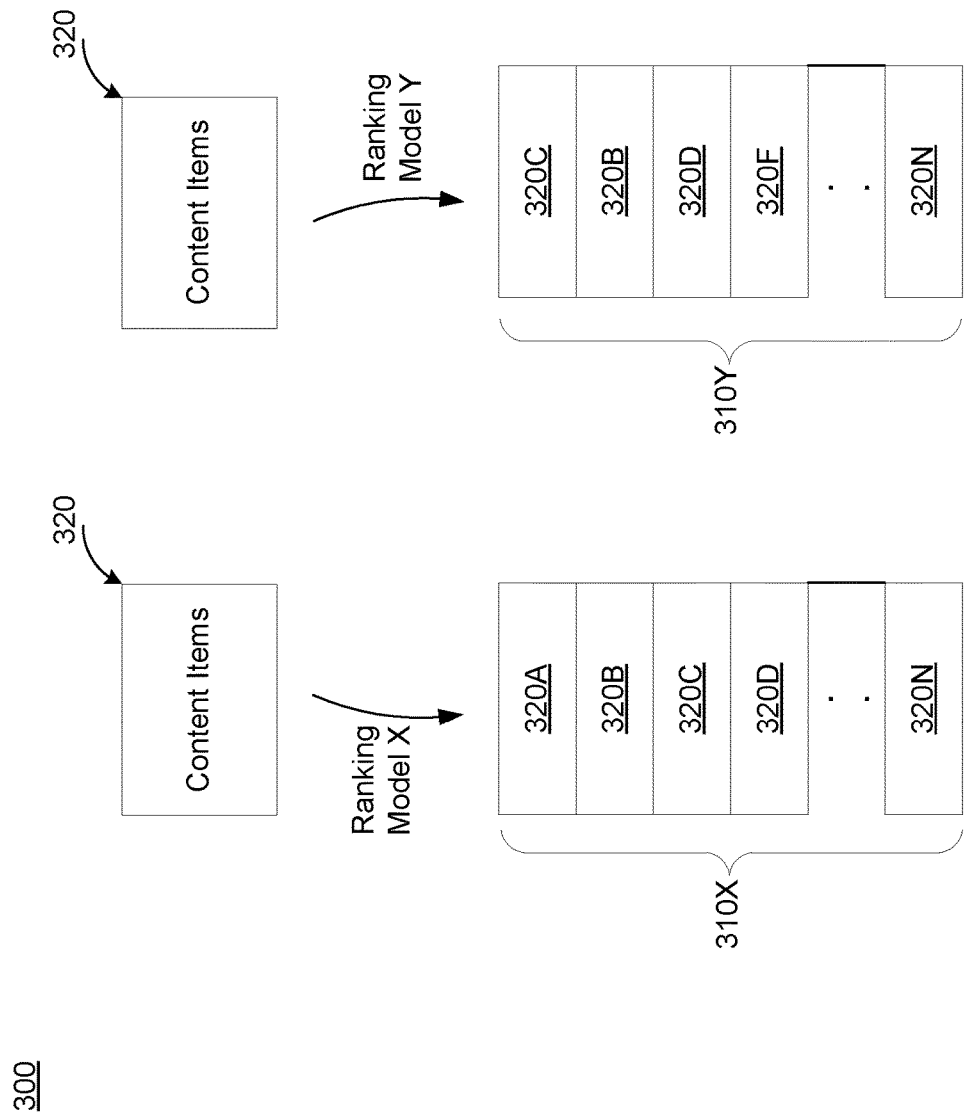
FIG. 3 is a block diagram of an example feed of content items presented to a user of a social networking system, in accordance with an embodiment.

FIG. 3 is a block diagram of an example feed 300 of content items presented by a social networking system 140 to a user, in accordance with an embodiment. FIG. 3 shows feeds of content items 310X and 310Y presented using different feed ranking models, ranking model X and ranking model Y. The feed of content items 310X is ranked using ranking model X and includes a plurality of content items 320A-320N selected from a set of content items 320 maintained by the social networking system 140. The feed of content items 310Y is ranked using ranking model Y and includes the plurality of content items 320A-320N in an order different from that of the feed of content items 310X.

Ranking models X and Y are feed ranking models described above in conjunction with feed ranking module 235 of FIG. 2. Each of the ranking models X and Y includes a general rule or collection of rules derived by machine learning techniques for computing a ranking score for each content item of a user. The ranking score computed under a ranking model includes various components that correspond to the various interaction rates for the content item attributes as described above in conjunction with feed ranking module 235 of FIG. 2. Each component has a weightage factor that may be different between various components. A ranking model may be varied by varying the weightage factors of the individual components of the ranking score.

In some embodiments, the weightage factors for one or more components are set to be different between ranking models X and Y such that ranking models X and Y result in different ranking scores for the same content item. In these embodiments, the ranking models X and Y generate different ranking scores for a set of content items which results in different ranking orders for the same set of content items to be presented to the user. For example, the top four ranked content items of the feed 310X presented using ranking model X, 320A, 320B, 320C, and 320D, are different from the top four content items 320C, 320B, 320D, and 320F presented in feed 310Y using ranking model Y.

In some embodiments, the social networking system 140 tests variations of feed ranking models to present more relevant content to its user population of interest by analyzing ratings on content items presented by each such test variation of the feed ranking model. An example process of analyzing ratings from a pool of human raters representative of the user population of interest to select an appropriate feed ranking model is described below in conjunction with FIG. 10.

Content Rating System

Figure 4:
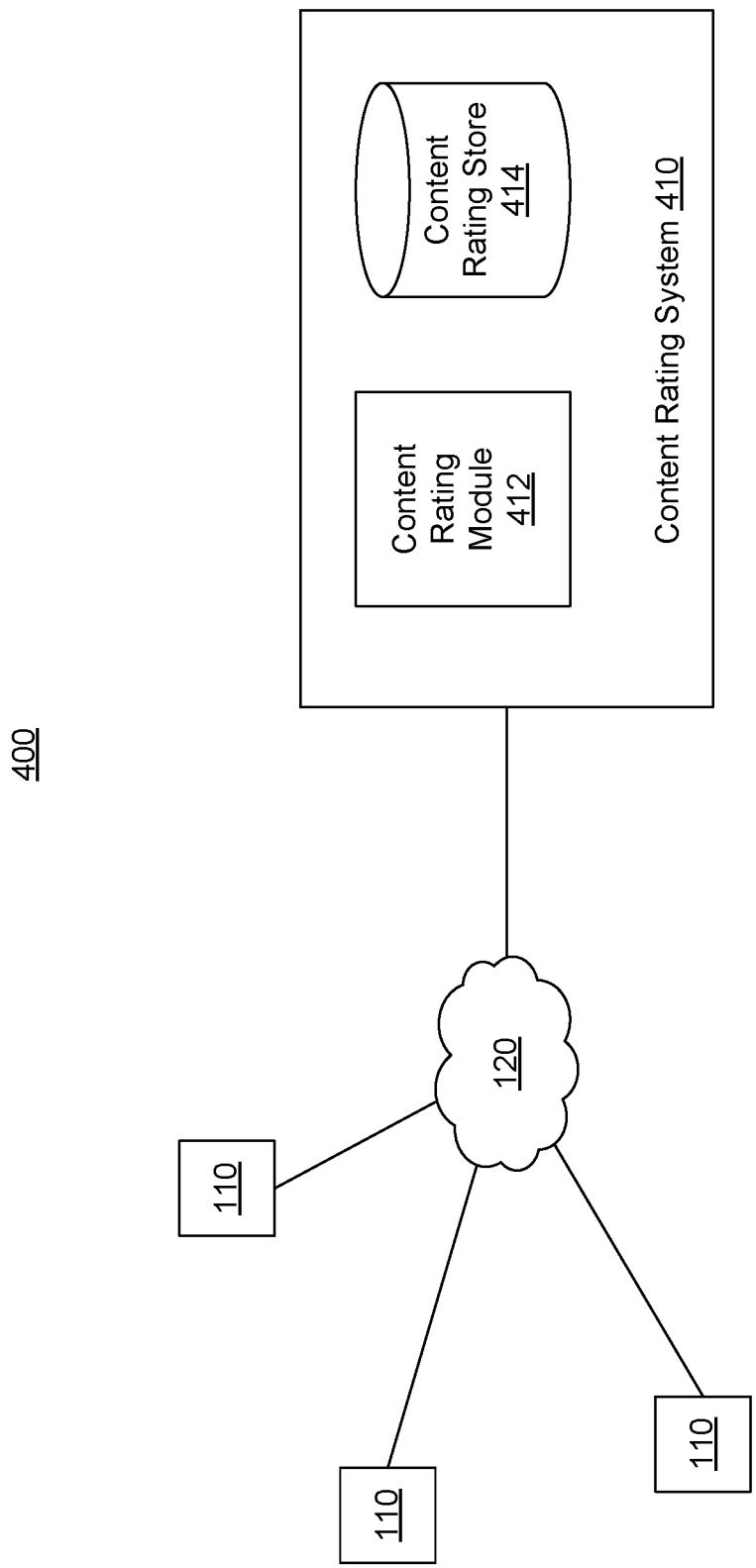
FIG. 4 is a block diagram of a content rating system, in accordance with an embodiment.

FIG. 4 is a block diagram of a system environment 400 for a content rating system 410, in accordance with an embodiment. The system environment 400 shown by FIG. 4 comprises one or more client devices 110, the network 120, and the content rating system 410. In alternative configurations, different and/or additional components may be included in the system environment 400.

The client devices 110 depicted in FIG. 4 are used by one or more human raters providing ratings on viewed content.

The human raters provide their content ratings to the content rating system 410 using the client devices 110 via the network 120. The content rating system 410 can be incorporated within or separate from the social networking system 140.

The content rating system 410 includes a content rating module 412 and a content rating store 414. The content rating module 412 receives content ratings from the client devices 110. Example content ratings include a numerical rating on a point scale and/or a text-based rating using comments. A numerical rating may be a rating between a range of numbers such as, for example, one through five, with one representing that the content is least relevant to the rater and five representing that the content is most relevant to the rater. Numerical ratings, as described herein, are based on a five point scale ranging from one to five with one representing the least possible rating and five representing the highest possible rating, unless otherwise specified. A text-based rating includes text-based ratings that express the rater's feelings about the content item in words.

The content rating store 414 stores objects that each represent various types of content ratings received at the content rating module 412. In one embodiment, the content rating system 410 is part of the social networking system 140. Alternatively or additionally, the content rating system 410 is a stand-alone system outside of the social networking system 140. The human raters provide ratings on the content they interact using an example rating process described below in conjunction with FIG. 5.

Figure 5:
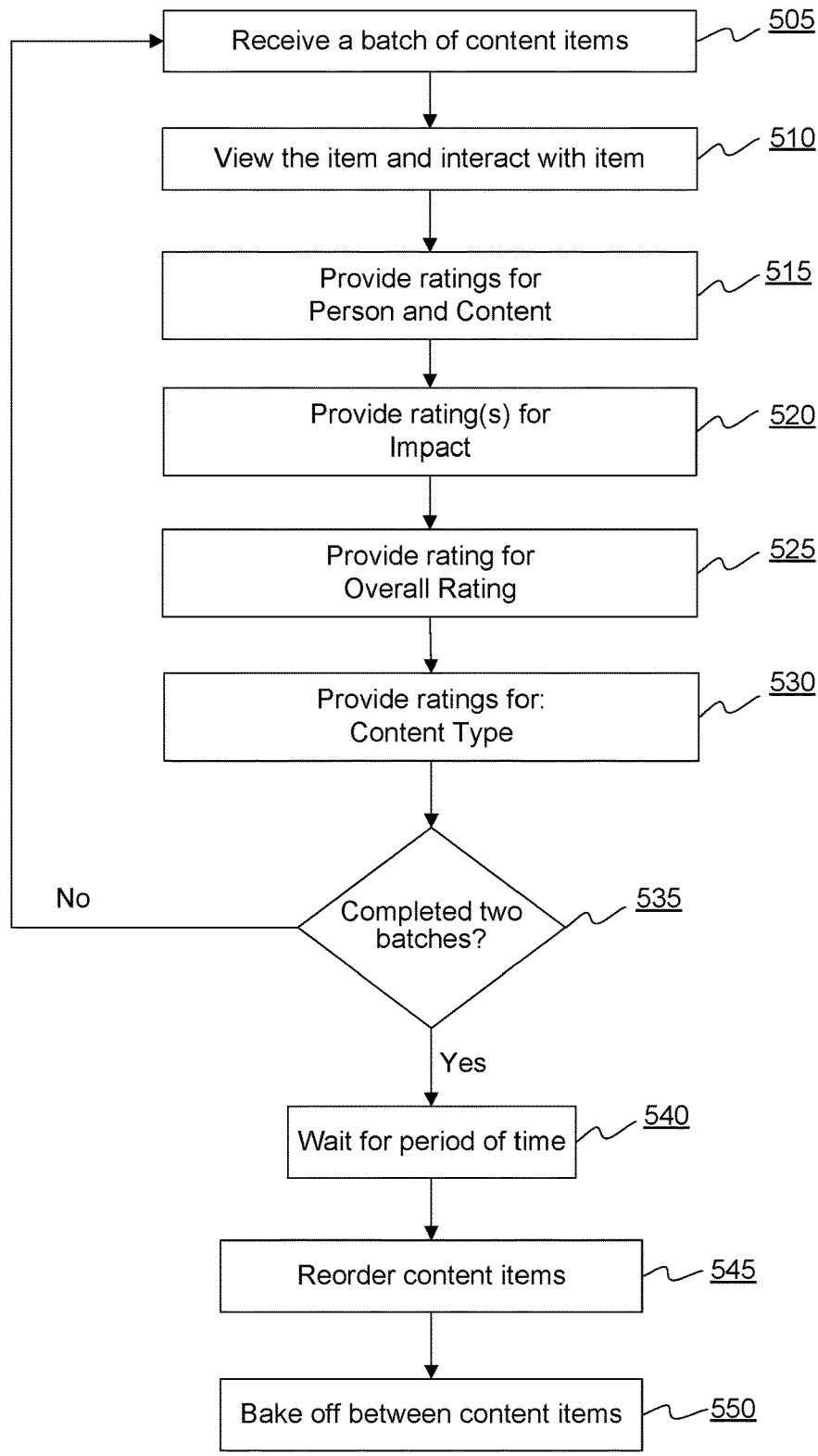
FIG. 5 is a flowchart of a process for rating content items of the social networking system by human raters of the content rating system of FIG. 4, in accordance with an embodiment.

FIG. 5 is a flowchart of a process for rating content items of the social networking system 140 by human raters of the content rating system 410, in accordance with an embodiment. The example process 500 may be implemented by various components of the content rating system 410. The example process 500 is described with reference to one human rater and may be repeated for each human rater of the pool of human raters, where the pool of human raters is identified to represent a user population of interest as described in conjunction with FIGS. 2 and 9.

The social networking system 140 provides each human rater with a feed of content items just as the social networking system 140 would provide each of its users with a feed of content items. The feed of content items includes a batch of content items. For example, each batch of content items includes thirty items. Each human rater provides ratings on a specific number of batches of content items in a given time period (e.g., a day). In the example process 500 of FIG. 5, each human rater provides ratings for two batches of content items, where each batch includes thirty items. The human raters provide ratings in accordance with certain guidelines provided by the social networking system 140.

The client device 110 corresponding to a human rater receives 505 a batch of content items. For each item of the batch of content items, the human rater views and/or interacts 510 with the content item as if the human rater would interact as a user of the social networking system 140. For example, the human rater may like, comment, share, click, or take any other action while interacting with the content item as the human rater would have done if this content item were posted in the human rater's news feed of the social networking system 140. The human rater views and may also interact with the content item before providing a rating for the content item. The human rater provides one or more ratings related to a person involved in the content item, content of the content item, an impact of the content item, a content type of the content item, entertainment value of the content item, informative value of the content item, and an overall rating of the content item.

The human rater provides 515 one or more ratings corresponding to a person and to content associated with the content item. The person rating is a numerical rating representing how much the human rater cares about the person associated with the content. For example, the number one represents that the person is someone the human rater really does not care about and five represents someone the human rater really cares about with the other numbers of the number scale representing gradations between the two extremes. The person may be an individual that is the author of the content item or an individual that was tagged in the content item. For example, the content item is a picture and the person involved with the picture is an individual that was tagged in the picture, which was either posted by the same individual or a different individual (irrespective of whether the human rater knows the individual or not).

In one embodiment, the content item may correspond to a brand page on the social networking system 140 rather than a person. A brand page is for businesses, brands, and organizations for sharing content associated with their organization with users on the social networking system 140. In some embodiments, there may be more than one person involved in the content item. Alternatively or additionally, the content item may feature one person and a page.

The content rating is also a numerical rating representing how much the human rater cares about the content of content item. For example, the number one represents that the content is something the human rater is really not interested in and five represents something the human rater is really interested in, with the other numbers of the number scale representing gradations between the two extremes.

The human rater provides 520 one or more ratings corresponding to an impact the content item has on the human rater. The impact ratings are typically derived from the person and content rating described above in conjunction with step 515. The human rater provides two ratings regarding the impact of the content item: type of impact and amount of impact. The type of impact rating represents a rating indicating how the human rater anticipates using the content item in the human rater's interactions on the social networking system 140. For example, the type of impact rating may include one or more of: a) using the information from the content item in discussions with other people, either online or offline; b) increasing information about one or more of person, page, product, event, or some combination thereof; c) having a desired emotional reaction to the content item (e.g., positive or negative); and d) not applicable indicating that there was either no impact or an undesired emotional reaction on the human rater.

The amount of impact rating reflects how much of an impact the content item had on the human rater and is related to the type of impact rating. For example, the amount of impact rating is a numerical rating with one representing that the content really doesn't have an impact (or has a negative impact) on the human rater and five representing that the content has a significant impact on the human rater, with the other numbers representing gradations between the two extremes. An example relationship between the amount of impact rating and the type of impact rating is described below. For instance if a human rater had a desired emotional reaction but it was small or at a low level, the amount of impact rating is expected to be a rating of three (e.g., a chuckle) as opposed to a rating of five (e.g., laughed hard for a few minutes).

The human rater provides 525 one or more ratings corresponding to an overall rating of the content item representing how much the human rater wants to see this content item on their news feed. For example, the overall rating is a numerical rating ranging between the numbers one through five, with one representing that the human rater definitely does not want to see the content item and five representing that that the human rater definitely wants to see the content item, with the other numbers representing gradations between the two extremes.

The ratings also include one or more comments corresponding to the overall rating of the content item that relate to one or more attributes of the content item such as the person(s)/page involved, content involved, and type and amount of impact. The comments are text-based inputs that include reasons why the human rater chose a particular numerical rating for the person, content, or impact ratings described above. For example, the human rater might provide reasons why the person is important (or unimportant) or why the topic of the content item was something the human rater really did (or did not) want to know about. The human rater may provide many other reasons for why the human rater would (or would not) want to see a particular content item in their news feed. The provided comments typically correlate with the numerical ratings for person(s)/page involved, content involved, and type and amount of impact. The social networking system 140 may perform quality checks on the human raters by comparing the numerical rating of a particular category of rating with its corresponding text-based rating as described below in conjunction with FIGS. 6 and 7.

In some embodiments, the human rater provides 530 one or more ratings corresponding to a type of the content involved in the content item representing whether the human rater categorizes the content as about family/friends, public content, or both. For example, if a friend shares something that is public content, the rating marks the content item as "public." However, if a friend shares something that is public content but the friend also adds additional personal information in the content item that makes the overall story seem personal, the human rater marks the content item as "both."

In some embodiments, the human rater provides one or more ratings corresponding to additional questions regarding the human rater's interaction with the content item. The additional questions may relate to one or more of how much does the content item: a) entertain the human rater; b) help the human rater feel connected; c) inform the human rater about the world; and d) matter to the human rater's life. The human rater provides rating for each of these questions as a numerical score with one representing the least amount of interaction between the content item and the human rater and five representing the most amount of interaction, with the other numbers of the scale representing gradations between the two extremes. In addition to providing numerical scores, the human rater also provides text-based ratings for each of the additional questions similar to the comments corresponding to person(s)/page involved, content involved, and type and amount of impact described above.

The human rater using a client device 110 accesses the content item and provides ratings related to steps 505 through 530 for each content item within the batch of content items. The content rating system 410 determines whether the human rater provided ratings for all content items within a batch of content items. Upon a negative determination, the content rating system 410 repeats the steps 505 through 530. Upon a positive determination, the content rating system 410 then checks whether the human rater provided ratings for the specified number of batches 535 of content items for the day. Upon a negative determination, the content rating system 410 provides a new batch of content items (received from the social networking system 140) to the human rater to provide ratings by repeating steps 505 through 530. Upon a positive determination that the human rater provided ratings for the specified number of batches of content items, the content rating system 410 indicates to the human rater to wait 540 for a period of time before performing next task of reordering content items. For example, the example process 500 includes two batches of content items.

After waiting for the period of time, the human rater reorders 545 content items that are displayed on the human rater's client device 110. The content rating system 410 displays a set of content items from the two batches of content items for the human rater to reorder. The human rater reorders the displayed content items in an order of overall relevance to the human rater. For example, if the human rater could only see one content item from the set of displayed content items, which content item would it be? Such content item is selected first after the reordering. If the human rater could only see two content items, which content items would they be? Those two content items are selected the first and second items. In summary, the human rater reorders the stories in order of how much the human rater would want to see the items, with the item the human rater wants to see most first. The reordered list of content items provides an indication of the most relevant content items for the human rater and may also be used for quality checks as described below in conjunction with FIG. 7.

The human rater participates in a quality check task such as "bake off" 550 between a series of content item pairs to select a content item in each pair with which the human rater is more interested to interact. The content items of the content item pairs are selected from one of the batches of content items the human rater had previously rated during the same day. The bake off task is described in more detail below in conjunction with FIG. 6.

Figure 6:
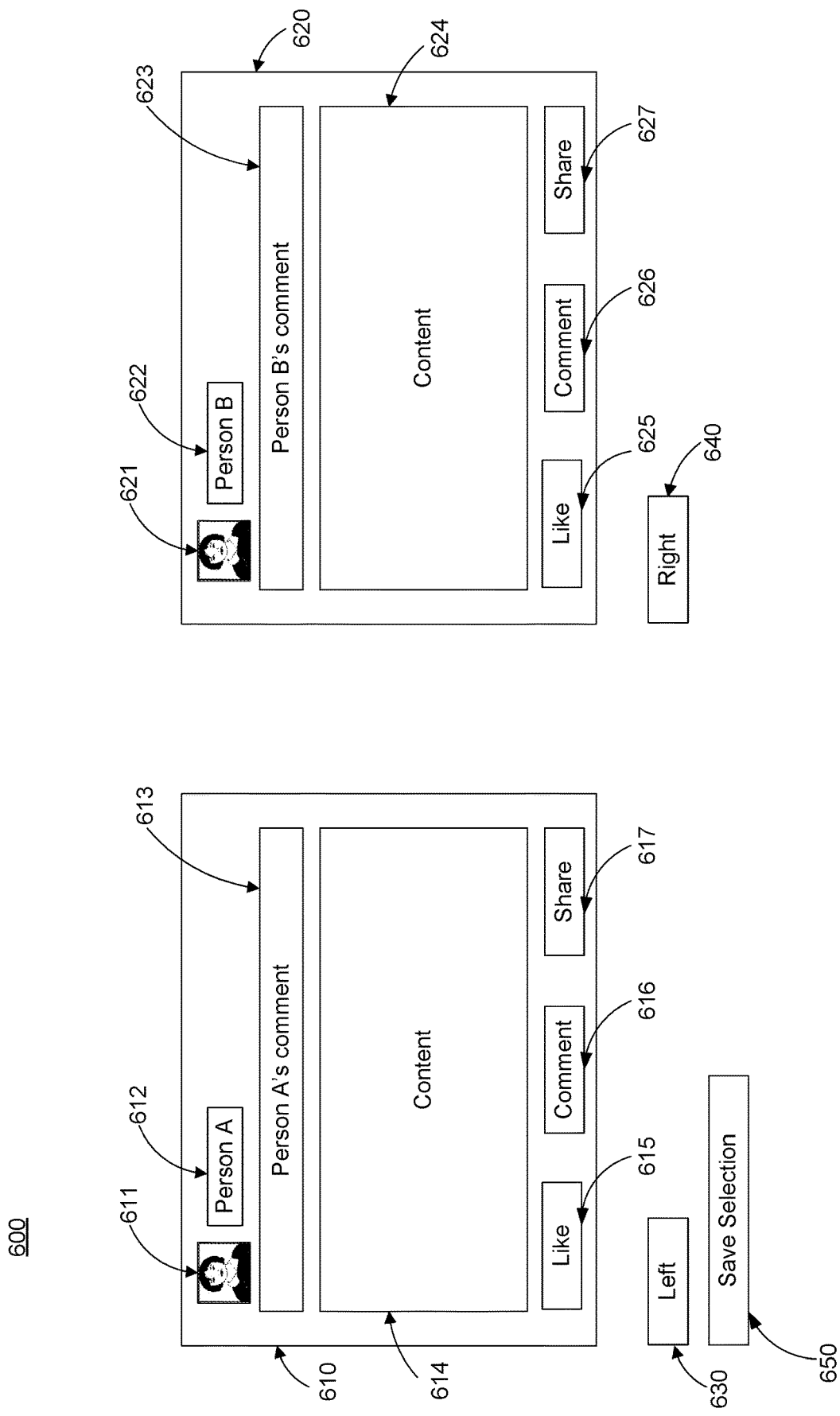
FIG. 6 is a block diagram of a user interface illustrating a bake off task for determining consistency of a human rater, in accordance with an embodiment.

FIG. 6 is a block diagram of a user interface 600 illustrating a bake off task for determining consistency of a human rater, in accordance with an embodiment. The user interface 600 shows two content items 610 and 620 side by side such that the human rater selects one of the two content items that the human rater is more interested to interact with. The results from the bake off task are stored in the content rating system 410 that can later be used by the social networking system 140 in determining a quality check metric for the human rater by comparing the bake off results with that of the human rater's previously provided ratings for the content items 610 and 620.

The content item 610 displayed on the left side of the bake off task is from a person A 612 with a picture 611. The item 610 includes content 614 and a comment 613 provided by person A. The item 610 displays options for the human rater to interact with the items such as like 615, comment 616, and share 617. The content item 620 displayed on the right side of the bake off task is from a person B 622 with a picture 621. The item 620 has includes content 624 and comment 623 similar to item 610. The item 620 displays options 625, 626, and 627 to interact with the item similar to that of item 610.

The user interface 600 includes buttons left 630 and right 640 to select one of the two content items 610 and 620. To select a content item, the user may select one of the left 630 or right 640 buttons, and then save their selection by pressing the save selection 650 button. The bake off task includes selecting content items for a series of content item pairs and the content rating system 410 stores the selections for each human rater. The bake off task is repeated for each human rater of the pool of human raters. The ratings provided by the pool of human raters are stored in the content rating store 414 and the stored ratings are used by one or more components of the social networking system 140 as described below in conjunction with FIG. 7.

Figure 7:
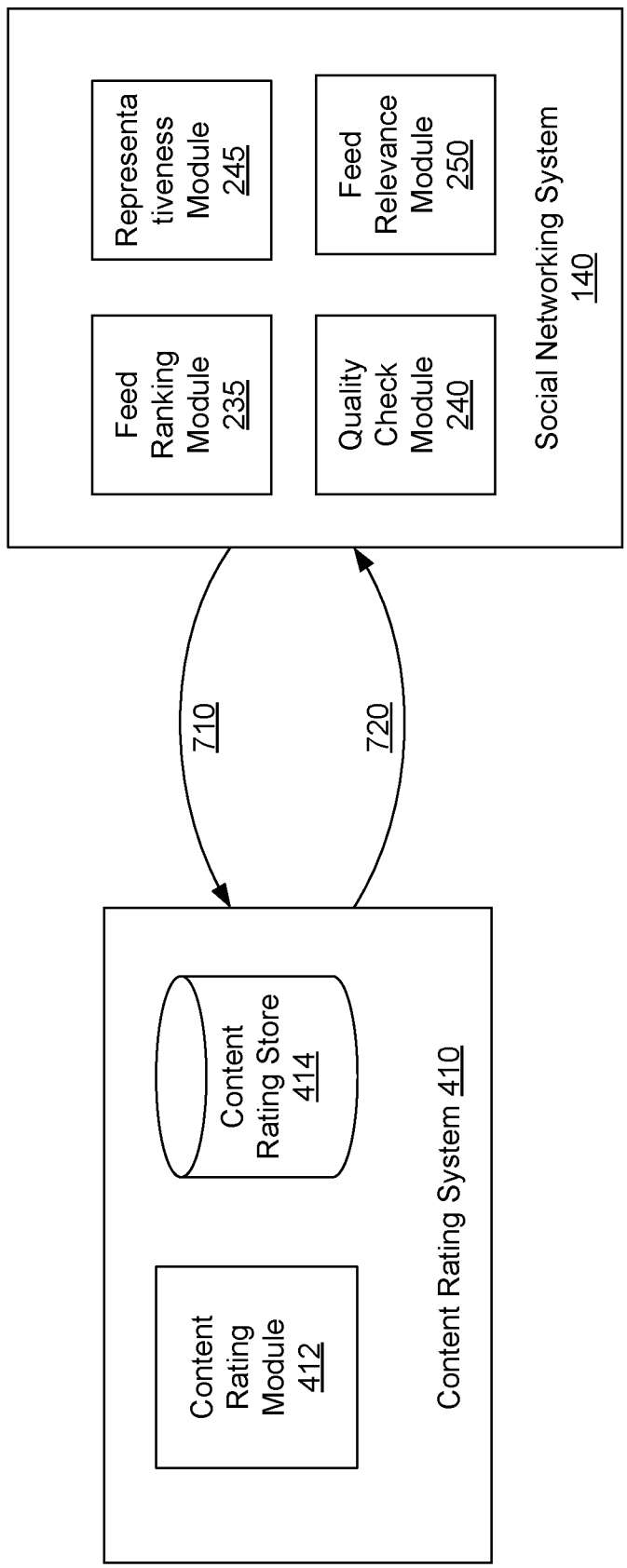
FIG. 7 is a block diagram illustrating an interaction between the social networking system of FIG. 2 and the content rating system of FIG. 4, in accordance with an embodiment.

FIG. 7 is a block diagram illustrating an interaction between the social networking system of FIG. 2 and the content rating system 410 of FIG. 4, in accordance with an embodiment. The block diagram of FIG. 7 includes the content rating system 410 of FIG. 4 and the social networking system 140 of FIG. 2. The social networking system 140 provides 710 a feed of content items for each of the human raters to the content rating system 410. The human raters of the content rating system 410 provide ratings for the content items of the feed of content items as described above in conjunction with FIG. 5.

The content rating system 410 provides 720 the content ratings to the social networking system 140 for further analysis to improve a relevance and quality of content provided to the users of the social networking system 140 by analyzing the ratings to modify a feed ranking model used to provide a feed of content items for improving the relevance of the content items provided to its users. The social networking system 140 may also modify the pool of human raters used to provide ratings such that the modified pool is representative of a user population of interest and/or provides content ratings at a minimum level of consistency.

The quality check module 240 of the social networking system 140 analyzes the ratings received from the content rating system 410 to perform quality checks on the human raters that provided those ratings. The quality check module 240 performs quality checks on the ratings to determine a degree of consistency for each human rater across the various ratings provided by the human rater. For example, the quality check module 240 computes a consistency score for each human rater, where the consistency score represents a degree of consistency across the various ratings provided by the human rater. In one embodiment, the consistency score includes two or more components associated with consistency factors such as person consistency, number-text consistency representing a consistency between numerical ratings and text-based ratings, temporal consistency, and bake off consistency. The quality check module 240 may compute a component score for each of the consistency components.

The quality check module 240 computes the component score for person consistency by comparing various ratings associated with a person that are provided by the human rater. For example, the human rater provides ratings for 10 different content items involving person A. The quality check module 240 analyzes the 10 ratings involving person A (numerical ratings and/or text-based ratings) to determine a level of consistency between the different ratings. If all 10 ratings have similar ratings, the person consistency component score is 1.0. If, on the other hand, only nine of the 10 ratings are similar, the person consistency component score is 0.9. Different ratings may be deemed as similar if the ratings convey more or less the same sentiment of the human rater towards person A. For example, numerical ratings three and four on a scale of five is deemed to be similar. In the same example, numerical ratings three and one or three and five are deemed not to be similar and results in reducing the person consistency component score.

The quality check module 240 computes the component score for number-text consistency by comparing a correlation between numerical ratings and their corresponding text-based ratings for each content item. In one example, the human rater provides a text-based rating and a numerical rating for the content involved in the content item for five different content items. The quality check module 240 analyzes the ratings to determine a level of consistency between the numerical ratings and the text-based ratings for each set of the five sets of ratings. A number-text consistency component score is computed based on a percentage of sets of ratings that are deemed to be match. For example, if three out of five sets of ratings match, the number-text consistency component score is 0.6, and if four out of five match, the number-text consistency component score is 0.8. A numerical rating is deemed to match a text-based rating if both the ratings convey more or less the same sentiment of the human rater towards content involved in the content item. For example, a numerical rating of three on a five point scale for the content is deemed to match a text-based rating that conveys that the human rater is somewhat interested in the content of the content item. In the same example, a numerical rating of four (i.e., human rater is interested in the content) is deemed not to be match a text-based rating that conveys that the human rater is not interested in the content and thereby reduces the number-text consistency component score.

The quality check module 240 computes the component score for temporal consistency by checking a consistency of the various ratings provided by the human rater over a period of time. For example, the human rater provides ratings for 20 different content items involving person B over a period of time. The quality check module 240 analyzes the 20 ratings involving person B (numerical ratings or text-based ratings) to determine a level of consistency between the different ratings over time. If all 20 ratings of the person B are similar, the temporal consistency component score is 1.0. If, on the other hand, only 10 of the 20 ratings are similar, the temporal consistency component score is 0.5. Different ratings over time may be deemed as similar if the ratings convey more or less the same sentiment of the human rater towards person B. For example, when average numerical rating associated with person B provided on day1 is 4.0 and an average numerical rating associated with person B provided on day2 is 4.2, the temporal consistency component score is computed as 95% or 0.95 as the two average ratings are within 5% of each other (delta between the average ratings is 0.2, which is 5% of rating 4.0). When the average numerical ratings are 2.0 and 1.5, temporal consistency component score is computed as 75% or 0.75 as the two average ratings are 25% apart from each other.

The quality check module 240 computes the component score for bake off consistency by analyzing results from a bake off task where the human rater selects a content item that the human rater is more interested to interact with from a pair of content items. The content items of the content item pairs used for the bake off are selected from one of the batches of content items the human rater had previously rated during the same day as described above in conjunction with FIG. 6. For each bake off task corresponding to a content item pair, the quality check module 240 analyzes the ratings provided by the human rater while rating the batches of content items and also the selection from the bake off task. For example, for the content items 610 and 620 displayed on the user interface 600 of FIG. 6, the quality check module 240 obtains the saved selection of the preferred item and compares with an overall rating of the items 610 and 620. If item 610 has a more preferable overall rating than that of item 620 and if the human rater selected item 610 in the bake off task, then the comparison results in a consistent result. If the human rater selected item 620 instead, then the comparison results in an inconsistent result.

The quality check module 240 repeats such comparison between the saved selection of the preferred item in the bake off task with that of the overall ratings for each content item pair involved in the bake off task to determine a bake off consistency component score. In an example when the bake off task includes 10 content item pairs, the quality check module performs 10 such comparisons and the component score is determined based on a percentage of consistent results. If all 10 comparisons result in consistent score, the bake off consistency component score is 1.0, and if only four of the 10 comparisons result in consistent score, the bake off consistency component score is 0.4.

The quality check module 240 computes an overall consistency score for the human rater by aggregating all of the component scores corresponding to the consistency factors such as person consistency, number-text consistency, temporal consistency, and bake off consistency. In some embodiments, the component scores are multiplied by a weightage factor that represents how important a particular component is for the overall consistency score, and the weightage factors are different between the various components. For example, the overall human rater consistency score may be a summation of the weighted component scores and may be computed for n components as:

$$\text{consistency score} = \sum_{k=1}^{n} \text{weight}_k * \text{component}_k$$

In the above equation, weight$_k$, is the weightage factor for the k$^{th}$ consistency component and component$_k$ is the component score of the k$^{th}$ consistency component. In the above equation, the n components represent the number of quality checks the quality check module 240 performs for each human rater.

The representativeness module 245 of the social networking system 140 analyzes the ratings received from the content rating system 410 and other factors such as the user demographics and user profile information to determine a level of similarity between the pool of human raters of the content rating system 410 and a user population of interest to the social networking system 140. The representativeness module 245 determines the level of similarity by computing a representative score for the pool of human raters based on a set of representativeness factors associated with human raters. An example set of representativeness factors may include age, gender, amount of time the human rater spends on the social networking system 140, an amount of likes for content generated by the human rater, and a percentage of content in the human rater's timeline associated with the human rater's friends as opposed to pages. A human rater's (or any user of the social networking system 140) timeline is a space on the human rater's profile on the social networking system 140 where one can see the human rater's own content, content from the human rater's friends, and content where the human rater is tagged in. The representativeness module 245 may compute a component score for each of the factors, and then combine the individual component scores to compute an overall representativeness score for the pool of human raters.

The representativeness module 245 computes the component score for each of the factors by comparing a distribution corresponding to each factor between the pool of human raters and the user population of interest. In one embodiment, the distribution of a factor is compared by comparing one or more statistical quantities such as mean. For example, if the mean age of the user population of interest is 25 and that of the pool of human raters is 26, the component score for the age factor may be 0.96 as the average age of the pool of human raters is different from that of the user population of interest by four percent. In some embodiments, other statistical quantities such as standard deviation or a combination of different statistical quantities may be used to compute component scores.

The representativeness module 245 computes an overall representativeness score for the pool of human raters by aggregating all of the component scores corresponding to each of the representativeness factors. In some embodiments, each component score is multiplied by a weightage factor that represents how important a particular component is for the overall representativeness score, and the weightage factor is different between the various components. For example, the overall representativeness score for the pool of human raters may be a summation of the weighted component scores and may be computed for n components as:

$$\text{representativeness score} = \sum_{k=1}^{n} \text{weight}_k * \text{component}_k$$

In the above equation, weight$_k$, is the weightage factor for the k$^{th}$ representativeness component and component$_k$ is the component score of the k$^{th}$ representativeness component. In the above equation, the n components represent the number of representativeness factors used by the representativeness module 245 for evaluating the similarity between the pool of human raters and the user population of interest.

In some embodiments, the representativeness score of the pool of human raters includes a sub-score for each human rater of the pool of human raters. The representativeness module 245 computes a representativeness sub-score for each rater of the pool of human raters that indicates a level of similarity between the human rater and an average user of the user population of interest. For example, the representativeness sub-score may be computed similar to the representativeness score of the pool of human raters and may include component scores corresponding to each of the representativeness factors a per human rater level.

The feed relevance module 250 of the social networking system 140 analyzes the ratings received from the content rating system 410 to determine a degree of relevance of content items provided via a feed ranking model that provides the feed of content items to the human rater. The feed relevance module 250 determines the degree of relevance by computing a relevance score for each human rater based on the various ratings provided by the human rater for content items delivered using the feed ranking model. In one embodiment, the relevance score includes one or more relevance components such as person relevance, content relevance, type of impact relevance, amount of impact relevance, a type of content relevance, entertainment value relevance, informative value relevance, and an overall relevance. The feed relevance module 250 may compute a component score for each of the relevance components.

The feed relevance module 250 computes the component score for each of the relevance components by determining a numerical value for the received rating corresponding to the relevance component. For example, the component score for person relevance is computed by using the person rating provided by the human rater and received from the content rating system 410. The person relevance component score can be computed on an absolute scale by using the numerical value of the person rating such as on a five point scale. For example, if the person rating is four out of five, then the person relevance component score is also four. Alternatively, the person relevance component score can be computed on a relative scale by using the relative numerical value of the person rating. For the example person rating of four out of five, the person relevance component score in the relative scale is 0.8 (i.e., four relative to five).

The feed relevance module 250 computes an overall relevance score for each human rater by aggregating all of the component scores corresponding each of the relevance factors. In some embodiments, each component score is multiplied by a weightage factor that represents how important a particular component is for the overall relevance score, and the weightage factor is different between the various components. For example, the overall relevance score for the human raters may be a summation of the weighted component scores and may be computed for n components as:

$$\text{relevance score} = \sum_{k=1}^{n} \text{weight}_k * \text{component}_k$$

In the above equation, $\text{weight}_k$, is the weightage factor for the $k^{th}$ relevance component and $\text{component}_k$ is the component score of the $k^{th}$ relevance component. In the above equation, the n components represent the number of relevance factors used by the feed relevance module 250 for determining the relevance of the content items provided by the feed ranking model.

In some embodiments, the feed relevance module 250 computes a relevance score for the pool of human raters that represents how relevant the content items provided by the feed ranking model are to the pool of human raters as a whole. For example, the feed relevance module 250 computes the relevance score for the pool of human raters by determining an average value of the relevance scores for each human rater of the pool of human raters.

Method for Selecting Quality Controlled Human Raters

Figure 8:
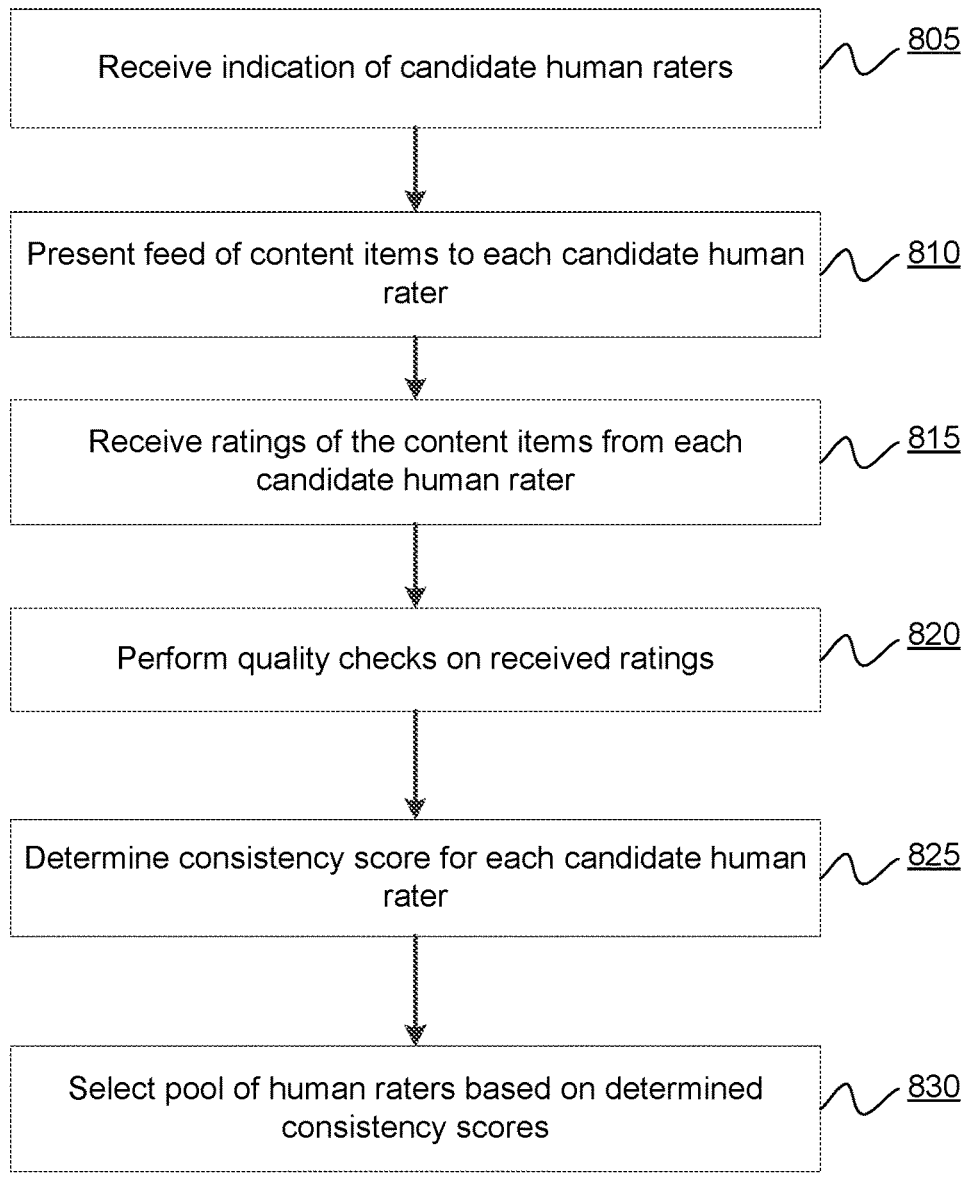
FIG. 8 is a flowchart of a process for selecting a pool of quality controlled human raters for improving content relevance in a social networking system, in accordance with an embodiment.

FIG. 8 is a flowchart of a process 800 for selecting a pool of quality controlled human raters for improving content relevance in a social networking system 140, in accordance with an embodiment. Unless otherwise noted, the example process 800 of FIG. 8 is performed by the social networking system 140, which may store instructions that cause a processor on the social networking system 140 to execute the example process 800. The example process 800 may include additional or alternative steps.

The social networking system 140 receives 805 an indication of a set of candidate human raters for providing content ratings. The social networking system 140 may receive the set of candidate human raters from the content rating system 410 or from the representativeness module 245 of the social networking system 140.

For each candidate human rater of the set of candidate human raters, the social networking system 140 presents a feed of content items, receives ratings on the feed of content items, and performs quality checks on the received ratings to select a pool of human raters from the set of candidate human raters as described in detail below.

The social networking system 140 presents 810 a feed of content items to each candidate human rater of the set of candidate human raters as described above in conjunction with the content selection module 230 of FIG. 2. Each candidate human rater provides content ratings on each content item of the feed of content items as described above in conjunction with FIG. 5.

The social networking system 140 receives 815 ratings provided by each candidate human rater from the content rating system 410. The received ratings include ratings on the people involved in the content item, the content of the content item, a type and an amount of impact the content item has on the candidate human rater, a content type of the content item, entertainment value of the content item, informative value of the content item, and an overall rating of the content item as described above in conjunction with FIG. 5.

The social networking system 140 performs 820 quality checks on the received ratings. The quality checks are performed on the received ratings to determine a degree of consistency for each candidate human rater across the various ratings provided by the human rater. Example quality checks include person consistency, number-text consistency, temporal consistency, and bake off consistency as described above in conjunction with FIG. 7.

The social networking system 140 determines 825 a consistency score for each candidate human rater based on results of the performed quality checks on the received ratings. The consistency score includes one or more components associated with consistency factors such as person consistency, number-text consistency, temporal consistency, and bake off consistency, and the consistency score may be computed by aggregating the one or more component scores of the consistency factors as described above in conjunction with FIG. 7.

The social networking system 140 selects 830 a pool of human raters from the set of candidate human raters based on the determined consistency scores. In one embodiment, the pool of human raters is selected from the plurality of candidate human raters by selecting candidate human raters with a consistency score above a threshold consistency score. For example, the social networking system 140 may determine the threshold consistency score as 0.8 or 80%, meaning that a human rater needs to be consistent at least 80% of the time to pass the threshold consistency score. The social networking system 140 may determine the threshold consistency score based on machine learning algorithms over time. Alternatively, the social networking system 140 selects the pool of human raters by selecting a percentage of candidate human raters such that the selected pool of human raters have a consistency scores higher than the candidate human raters not selected. For example, if the percentage is 90%, the top 90% of candidate human raters with higher consistency scores are selected.

In some embodiments, the candidate human raters are selected so as to represent a user population of interest to the social networking system 140. Additionally or alternatively, the social networking system 140 selects the pool of human raters such that the pool of human raters represent the user population of interest to the social networking system 140. For example, the social networking system 140 may delete some candidate human raters from the pool of human raters that do not represent the user population of interest as described in conjunction with representativeness module 245 of FIG. 7 and the example process 900 of FIG. 9.

Method for Selecting Human Raters Representative of User Population of Interest

Figure 9:
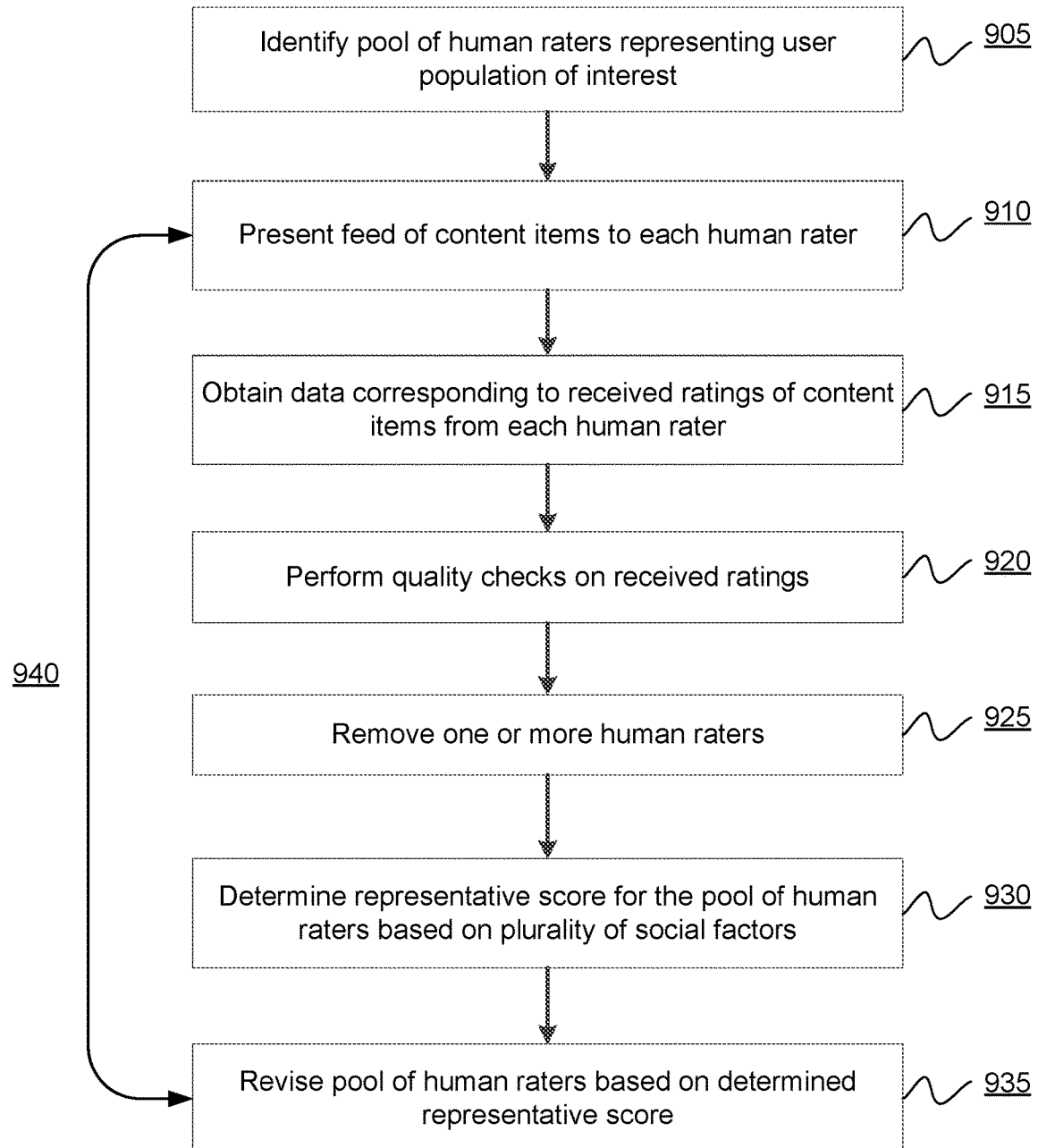
FIG. 9 is a flowchart of a process for selecting a pool of representative human raters for improving content relevance in a social networking system, in accordance with an embodiment.

FIG. 9 is a flowchart of a process 900 for selecting a pool of representative human raters for improving content relevance in the social networking system 140, in accordance with an embodiment. Unless otherwise noted, the example process 900 of FIG. 9 is performed by the social networking system 140, which may store instructions that cause a processor on the social networking system 140 to execute the example process 900. The example process 900 may include additional or alternative steps.

The social networking system 140 identifies 905 a pool of human raters for providing ratings on a feed of content items of the social networking system 140. The identified pool of human raters represents a user population of interest to the social networking system 140.

For each human rater of the identified pool of human raters, the social networking system 140 presents a feed of content items, obtains ratings on the feed of content items, and determines a representativeness score for the pool of human raters in order to revise the identified pool of human raters such that the revised pool better represents the user population of interest as described in detail below.

The social networking system 140 presents 910 a feed of content items to each human rater of the pool of candidate human raters as described above in conjunction with the content selection module 230 of FIG. 2. Each human rater provides content ratings on each content item of the feed of content items as described above in conjunction with FIG. 5.

The social networking system 140 obtains 915 ratings provided by each human rater of the pool of human raters from the content rating system 410. The obtained ratings include ratings on the people involved in the content item, the content of the content item, a type and an amount of impact the content item has on the candidate human rater, a content type of the content item, entertainment value of the content item, informative value of the content item, and an overall rating of the content item as described above in conjunction with FIG. 5.

In some embodiments, the social networking system 140 performs 920 quality checks on the obtained ratings. The quality checks are performed on the obtained ratings to determine a degree of consistency for each human rater across the various ratings provided by the human rater. Example quality checks include person consistency, number-text consistency, temporal consistency, and bake off consistency as described above in conjunction with FIG. 7.

In some embodiments, the social networking system 140 removes 925 one or more human raters from the pool of human raters based on the quality checks performed on the obtained data. For example, the social networking system 140 computes a consistency score for each human rater and selects the human raters to be removed from the pool based on the consistency score similar to the step 830 described above in conjunction with FIG. 8.

The social networking system 140 determines 930 a representativeness score for the identified pool of human raters based on the obtained ratings data. The representativeness score includes one or more components associated with representativeness factors such as age, gender, amount of time spent on the social networking system 140, amount of likes, and a percentage of content associated with friends as opposed to pages. The representativeness score may be computed by aggregating the one or more component scores of the representativeness factors as described above in conjunction with FIG. 7.

The social networking system 140 revises 935 the pool of human raters based on the determined representativeness scores. In one embodiment, the revising of the pool of human raters includes either deleting one or more human raters or adding one or more human raters. The deleting and/or adding of one or more human raters may be based on a representativeness sub-score associated with each human rater of the pool of human raters. For example, one or more human raters with a representativeness sub-score below a threshold sub-score may be deleted from the pool and above the threshold sub-score may be added to the pool. In another example, outlier human raters (e.g., human raters with representativeness sub-scores above and/or below a number of standard deviations relative to a mean sub-score for the pool of human raters) may be deleted from the pool. A computation of the representativeness sub-score for each human rater is described above in conjunction with representativeness module 245 of FIG. 7.

The social networking system 140 revises 935 the pool of human raters to ensure that a representativeness score for the revised pool is above a threshold score. For example, the social networking system 140 may determine the threshold representativeness score as 0.9 or 80%, meaning that the pool of human raters as a group needs to be at least 90% similar with the user population of interest to meet the threshold score. The social networking system 140 may determine the threshold representativeness score based on machine learning algorithms over a period of time.

In some embodiments, the social networking system 140 iterates 940 the steps of presenting a feed of content items, obtaining ratings, determining a representativeness score, and revising the pool of human raters until the revised pool is similar enough to the user population of interest. This revision of the pool of raters can be conducted regularly throughout the rating process to ensure that the pool of raters remains representative of the user population of interest.

Method for Selecting Feed Ranking Model to Improve Feed Relevance

Figure 10:
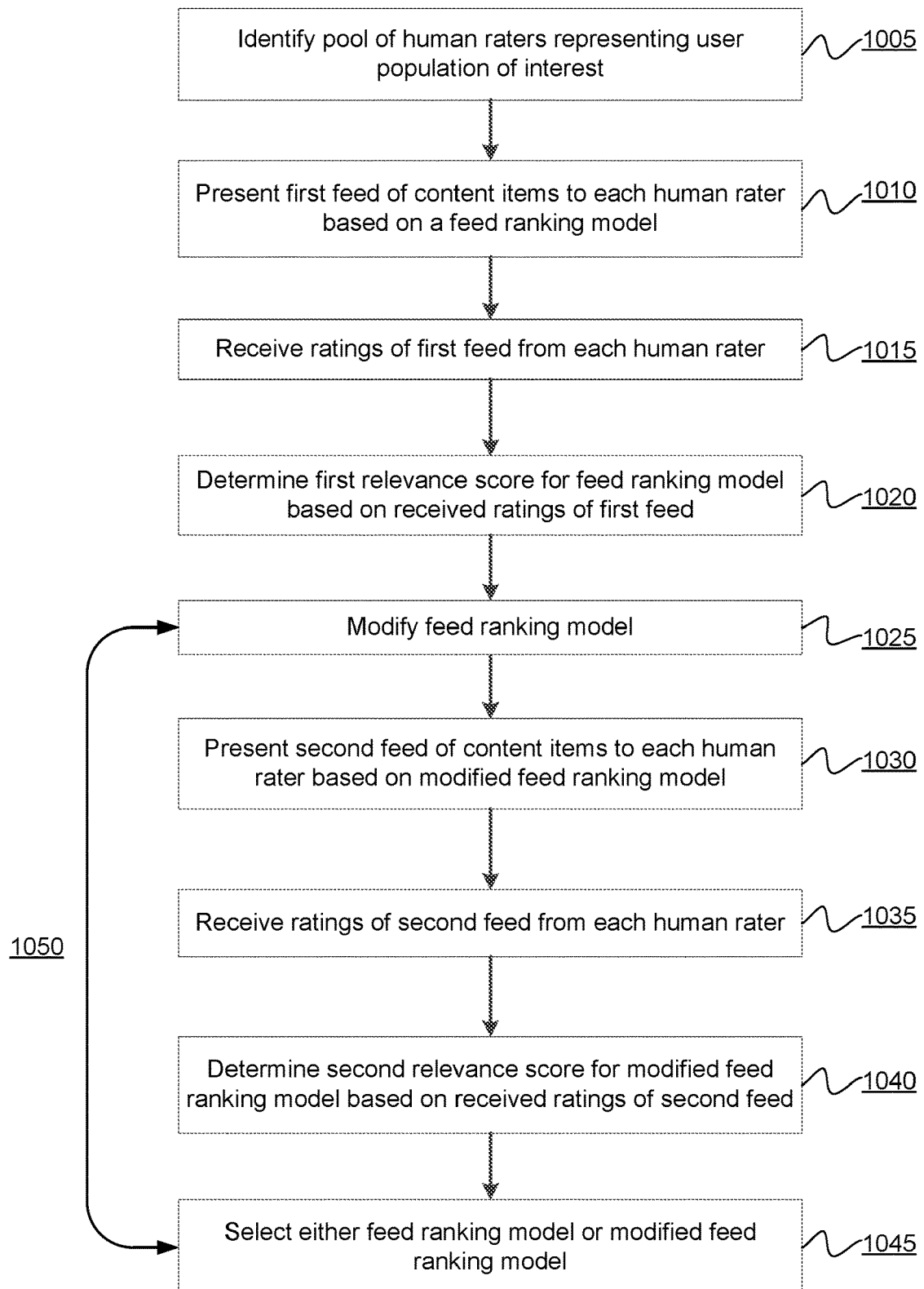
FIG. 10 is a flowchart of a process for selecting a feed ranking model for improving content relevance in a social networking system, in accordance with an embodiment.

FIG. 10 is a flowchart of a process 1000 for selecting a feed ranking model for improving content relevance in a social networking system 140, in accordance with an embodiment. Unless otherwise noted, the example process 1000 of FIG. 10 is performed by the social networking system 140, which may store instructions that cause a processor on the social networking system 140 to execute the example process 1000. The example process 1000 may include additional or alternative steps.

The social networking system 140 identifies 1005 a pool of human raters for providing ratings on a feed of content items of a social networking system 140. The identified pool of human raters represents a user population of interest to the social networking system 140.

For each human rater of the identified pool of human raters, the social networking system 140 presents a first feed of content items based on a feed ranking model, obtains ratings on the first feed of content items, and determines a relevance score for the feed ranking model. The social networking system 140 then repeats the above process by presenting a second feed of content items based on a modified ranking model, obtaining ratings on the second feed of content items, and determining a relevance score for the modified ranking model. The social networking system 140 selects one of either the feed ranking model or the modified feed ranking model based on the determined relevance scores as described in detail below.

The social networking system 140 presents 1010 a first feed of content items to each human rater of the pool of human raters based on a feed ranking model as described above in conjunction with the content selection module 230 of FIG. 2. Each human rater provides content ratings on each content item of the first feed of content items as described above in conjunction with FIG. 5.

The social networking system 140 receives 1015 ratings provided by each human rater of the pool of human raters for the content item of the first feed of content items from the content rating system 410. The received ratings include ratings on the people involved in the content item, the content of the content item, a type and an amount of impact the content item has on the candidate human rater, a content type of the content item, entertainment value of the content item, informative value of the content item, and an overall rating of the content item as described above in conjunction with FIG. 5.

The social networking system 140 determines 1020 a first relevance score for each human rater for the feed ranking model based on the received ratings. The first relevance score includes one or more components associated with relevance factors such as person relevance, content relevance, type of impact relevance, amount of impact relevance, a type of content relevance, entertainment value relevance, informative value relevance, and an overall relevance. The first relevance score may be computed by aggregating the one or more component scores of the relevance factors as described above in conjunction with FIG. 7.

In some embodiments, the social networking system 140 determines the first relevance score for the plurality of human raters as a group representing a degree of relevance of content items provided by the feed ranking model. The first relevance score for the group may be determined by computing an average value of the first relevance scores for each human rater of the plurality of human raters and is referred to as first group relevance score.

The social networking system 140 modifies 1025 the feed ranking model to vary the content items presented to the human raters. In one embodiment, the social networking system 140 modifies the feed ranking model by varying an equation that computes a ranking score for each content item to be presented in a feed of content items. For example, the social networking system 140 varies the equation by changing one or more weightage factors associated with components of the ranking score, where each component corresponds to various interaction rates of the content item attributes such as CTR, LTR, CoTR, and STR as describe above in conjunction with FIGS. 2 and 3. The modified feed ranking model may be determined based on observing the ratings of the raters using the feed ranking model over time and determining that certain modifications could be made to potentially improve the feed ranking model. For example, if raters tend to be consistently saying that the feeds are skewed toward having too much sponsored content and do not have enough stories from connections in the social networking system 140, the feed ranking model can be modified to address these issues.

The social networking system 140 presents 1030 a second feed of content items to each human rater of the pool of candidate human raters based on the modified feed ranking model. Each human rater provides content ratings on each content item of the second feed of content items similar to the ratings provided on the first feed of content items.

The social networking system 140 receives 1035 ratings provided by each human rater of the pool of human raters for the second feed of content items from the content rating system 410. The received ratings for the second feed are similar to that of the ratings on the first feed and include ratings on the people involved in the content item, the content of the content item, a type and an amount of impact the content item has on the candidate human rater, a content type of the content item, entertainment value of the content item, informative value of the content item, and an overall rating of the content item.

The social networking system 140 determines 1040 a second relevance score for each human rater for the modified feed ranking model based on the received ratings of the second feed. Similar to the first relevance score, the second relevance score for the modified ranking model also includes one or more components associated with relevance factors such as person relevance, content relevance, type of impact relevance, amount of impact relevance, a type of content relevance, entertainment value relevance, informative value relevance, and an overall relevance. The second relevance score for the modified feed ranking model may be computed similar to that of the first relevance score by aggregating the one or more component scores of the relevance factors.

In some embodiments, the social networking system 140 determines the second relevance score for the plurality of human raters as a group for the modified feed ranking model similar to the first group relevance score of the feed ranking model.

The social networking system 140 selects 1045 one of the feed ranking model or the modified feed ranking model for presenting feeds of content items based on a comparison between the first relevance score and the second relevance score. For example, the social networking system 140 selects the ranking model with the highest relevance score, where the relevance score either corresponds to an individual relevance score or a group relevance score.

In some embodiments, the social networking system 140 iterates 1050 the steps of modifying the feed ranking model, presenting a feed of content items based on the modified ranking model, obtaining ratings, determining a relevance score, and selecting a feed ranking model until the selected feed ranking model provides content items with sufficient degree of relevance to the user population of interest. The social networking system 140 can essentially run a simulation of each modified model on the raters and compare the ratings of feeds from these models with the ratings of feeds from other models. Over time, the social networking system 140 can slowly improve its feed ranking model by modifying and testing how each modification performs.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    identifying a pool of human raters for providing ratings on feeds of content items of a social networking system, the pool of human raters identified to represent a user population of interest to the social networking system, wherein the social networking system comprises a computer system;
    providing, by the social networking system for display to each rater of the identified pool of human raters, a first feed of content items;
    obtaining, from each rater of the identified pool of human raters, ratings of each of a plurality of content items of the first feed;
    determining a representativeness score for the identified pool of human raters based on the obtained ratings data, the representativeness score indicating a level of similarity between a composition of the pool of human raters and a composition of the user population of interest, the representativeness score determined based on a plurality of representativeness factors;
    revising the composition of the pool of human raters based on the determined representativeness score of the pool of human raters, the revised pool of human raters having characteristics that are representative of characteristics of the user population of interest;
    providing, by the social networking system for display to each rater of the revised pool of human raters, a second feed of content items;
    obtaining, from each rater of the revised pool of human raters, ratings of each of a plurality of the content items of the second feed;
    selecting content items for users in the user population of interest based on the obtained ratings; and
    providing the selected content items for display to the users in the user population of interest in feeds of the social networking system.

2. The computer-implemented method of claim 1, wherein revising the composition of the pool of human raters comprises at least one of: deleting one or more human raters with representativeness sub-scores below a threshold sub-score and adding one or more human raters with representativeness sub-scores above the threshold sub-score, the representativeness sub-score of a human rater indicates a level of similarity between the human rater and an average user of the user population of interest.

3. The computer-implemented method of claim 1, further comprising removing one or more human raters from the identified pool of human raters based on performing quality checks on the obtained ratings data, wherein the representativeness score is determined for the pool of human raters after the removal based on the quality checks.

4. The computer-implemented method of claim 3, wherein the quality checks performed on the obtained data comprises at least one of: person consistency, number-text consistency representing a consistency between numerical ratings and text-based ratings, temporal consistency representing a consistency over time, and bake off consistency representing a consistency between content item pairs.

5. The computer-implemented method of claim 1, wherein the representativeness score comprises two or more component scores, each of the two or more component scores corresponding to one of the plurality of representativeness factors, the plurality of representativeness factors comprise at least two of: age, gender, amount of time spent on the social networking system, amount of likes, and a percentage of content associated with friends as opposed to pages.

6. The computer-implemented method of claim 5, wherein the representativeness score is a summation of all component scores of the two or more component scores corresponding to one of the plurality of representativeness factors.

7. The computer-implemented method of claim 6, wherein each of the two or more component scores comprise a weightage factor representing a level of importance of a corresponding representativeness factor to the overall representativeness score.

8. The computer-implemented method of claim 7, wherein a weightage factor corresponding to a first component score is different from a weightage factor corresponding to a second component score.

9. The computer-implemented method of claim 1, wherein the user population of interest to the social networking system represents at least one of: a population of a country and a social networking system user population of a country.

10. A computer-implemented method comprising:
    identifying a pool of human raters for providing ratings on feeds of content items of a social networking system, the pool of human raters identified to represent a user population of interest to the social networking system, wherein the social networking system comprises a computer system;

providing, by the social networking system for display to each rater of the identified pool of human raters, a first feed of content items;

obtaining, from each rater of the identified pool of human raters, ratings of each of a plurality of content items of the first feed;

removing one or more human raters from the identified pool of human raters based on performing quality checks on the obtained ratings data;

determining a representativeness score for the pool of human raters after the one or more human raters are removed based on the obtained ratings data, the representativeness score indicating a level of similarity between a composition of the pool of human raters and a composition of the user population of interest after the one or more human raters are removed, the representativeness score determined based on a plurality of representativeness factors;

revising the composition of the pool of human raters based on the determined representativeness score of the pool of human raters, the revised pool of human raters representing the user population of interest;

providing, by the social networking system for display to each rater of the revised pool of human raters, a second feed of content items;

obtaining, from each rater of the revised pool of human raters, ratings of each of a plurality of the content items of the second feed;

selecting content items for users in the user population of interest based on the obtained ratings; and providing the selected content items for display to the users in the user population of interest in feeds of the social networking system.

11. The computer-implemented method of claim 10, wherein the quality checks performed on the obtained ratings data comprise at least one of: person consistency, number-text consistency representing a consistency between numerical ratings and text-based ratings, temporal consistency representing a consistency over time, and bake off consistency representing a consistency between content item pairs.

12. The computer-implemented method of claim 10, wherein revising the composition of the pool of human raters comprises at least one of: deleting one or more human raters with representativeness sub-scores below a threshold sub-score and adding one or more human raters with representativeness sub-scores above the threshold sub-score, the representativeness sub-score of a human rater indicates a level of similarity between the human rater and an average user of the user population of interest.

13. The computer-implemented method of claim 10, wherein the representativeness score comprises two or more component scores, each of the two or more component scores corresponding to one of the plurality of representativeness factors, the plurality of representativeness factors comprise at least two of: age, gender, amount of time spent on the social networking system, amount of likes, and a percentage of content associated with friends as opposed to pages.

14. The computer-implemented method of claim 13, wherein the representativeness score is a summation of all component scores of the two or more component scores corresponding to one of the plurality of representativeness factors.

15. The computer-implemented method of claim 14, wherein each of the two or more component scores comprise a weightage factor representing a level of importance of a corresponding representativeness factor to the overall representativeness score.

16. The computer-implemented method of claim 15, wherein a weightage factor corresponding to a first component score is different from a weightage factor corresponding to a second component score.

17. The computer-implemented method of claim 10, wherein the user population of interest to the social networking system represents at least one of: a population of a country and a social networking system user population of a country.

18. A computer program product comprising a non-transitory computer-readable storage medium having instructions encoded thereon that, when executed by a processor, cause the processor to:

identify a pool of human raters for providing ratings on feeds of content items of a social networking system, the pool of human raters identified to represent a user population of interest to the social networking system;

provide, by the social networking system for display to each rater of the identified pool of human raters, a first feed of content items;

obtain, from each rater of the identified pool of human raters, ratings of each of a plurality of content items of the first feed;

determine a representativeness score for the identified pool of human raters based on the obtained ratings data, the representativeness score indicating a level of similarity between a composition of the pool of human raters and a composition of the user population of interest, the representativeness score determined based on a plurality of representativeness factors;

revise the composition of the pool of human raters based on the determined representativeness score of the pool of human raters, the revised pool of human raters having characteristics that are representative of characteristics of the user population of interest;

provide, by the social networking system for display to each rater of the revised pool of human raters, a second feed of content items;

obtain, from each rater of the revised pool of human raters, ratings of each of a plurality of the content items of the second feed;

select content items for users in the user population of interest based on the obtained ratings; and provide the selected content items for display to the users in the user population of interest in feeds of the social networking system.

19. The computer program product of claim 18, wherein revising the composition of the pool of human raters comprises at least one of: deleting one or more human raters with representativeness sub-scores below a threshold sub-score and adding one or more human raters with representativeness sub-scores above the threshold sub-score, the representativeness sub-score of a human rater indicates a level of similarity between the human rater and an average user of the user population of interest.

20. The computer program product of claim 18, further comprising removing one or more human raters from the identified pool of human raters based on performing quality checks on the obtained ratings data, wherein the representativeness score is determined for the pool of human raters after the removal based on the quality checks.

* * * * *